US008922718B2

(12) United States Patent
House et al.

(10) Patent No.: US 8,922,718 B2
(45) Date of Patent: Dec. 30, 2014

(54) KEY GENERATION THROUGH SPATIAL DETECTION OF DYNAMIC OBJECTS

(75) Inventors: Gregory House, Doylestown, PA (US); Ximin Gong, Belle Mead, NJ (US); Cen Rao, Langhorne, PA (US); Yuecheng Zhang, Princeton, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 1106 days.

(21) Appl. No.: 12/909,508

(22) Filed: Oct. 21, 2010

(65) Prior Publication Data

US 2011/0102678 A1 May 5, 2011

Related U.S. Application Data

(60) Provisional application No. 61/253,742, filed on Oct. 21, 2009.

(51) Int. Cl.
*H04N 9/74* (2006.01)
*H04N 9/75* (2006.01)

(52) U.S. Cl.
CPC .................................. *H04N 9/75* (2013.01)
USPC .......................................... 348/591; 348/589

(58) Field of Classification Search
USPC ................. 348/468, 465, 169–170, 584–600; 382/190
See application file for complete search history.

(56) References Cited

U.S. PATENT DOCUMENTS

| 5,808,695 | A | 9/1998 | Rosser et al. |
| 5,953,076 | A | 9/1999 | Astle et al. |
| 6,100,925 | A | 8/2000 | Rosser et al. |
| 6,252,632 | B1 | 6/2001 | Cavallaro |
| 6,529,613 | B1 | 3/2003 | Astle |
| 7,015,978 | B2 | 3/2006 | Jeffers et al. |
| 2003/0216922 | A1* | 11/2003 | Gonzales et al. ............. 704/260 |
| 2003/0222994 | A1* | 12/2003 | Dawson ........................ 348/247 |
| 2008/0303942 | A1* | 12/2008 | Chang et al. .................. 348/468 |
| 2010/0259676 | A1* | 10/2010 | Swan ............................. 348/468 |
| 2011/0093882 | A1* | 4/2011 | Candelore et al. ............. 725/28 |

OTHER PUBLICATIONS

U.S. Appl. No. 12/403,857, filed Mar. 13, 2009 (pp. 1-44).

* cited by examiner

*Primary Examiner* — Michael Lee
(74) *Attorney, Agent, or Firm* — Fay Kaplun & Marcin, LLP

(57) ABSTRACT

A method, apparatus, and computer program product are described that utilizes spatial modeling to represent foreground objects of an event to allow virtual graphics to be integrated into a background of the event in the presence of dynamic objects. The present invention detects a presence of dynamic objects within a region of interest from a video depicting the event. The present invention produces a suppression key corresponding to the dynamic object when present in the video or a suppression key with a default value when and where no dynamic object is present in the video.

30 Claims, 7 Drawing Sheets

KEY GENERATION THROUGH SPATIAL DETECTION OF DYNAMIC OBJECTS

CROSS-REFERENCE TO RELATED APPLICATIONS

The present application claims the benefit of U.S. Provisional Patent Appl. No. 61/253,742, filed Oct. 21, 2009, which is incorporated by reference herein in its entirety.

BACKGROUND OF THE INVENTION

1. Field of the Invention

The present invention relates to the insertion of virtual graphics into a video stream such that these graphics may appear to be behind other graphics or complex colored objects in the video stream and/or in front of other complex colored objects or background structures in the video stream.

2. Related Art

Current occlusion schemes typically model consistently colored backgrounds with a single color range or a collection of color ranges. For many sporting applications, foreground objects may be distinguished from the consistently colored backgrounds based on these color ranges. Chroma keying techniques to handle occluding foreground objects in front of the consistently colored backgrounds are well known in the art, and are described, for example, in U.S. patent application Ser. No. 09/734,709, filed on Dec. 13, 2000, now U.S. Pat. No. 7,015,978, which is incorporated by reference herein in its entirety.

For cases where consistently colored backgrounds are not available, one approach that may be used is to place a logo without occlusion in a region of the scene where occluding objects are unlikely. This may lead to less than ideal placement from a visibility standpoint, and may still be susceptible to the occasional occlusion failure of projectile objects. Furthermore, there maybe failure due to overlap with other graphics which are likewise positioned in the region of the scene where occluding objects are unlikely.

Alternately, spatial patterns or warping of capture images have been proposed to model backgrounds with complex detail as described in U.S. patent application Ser. No. 08/662,089, filed on Jun. 12, 1996, now U.S. Pat. No. 5,953,076, which is incorporated by reference herein in its entirety. A key is formulated by comparing the modified background model with the input video, using a pixel by pixel comparison such used in background subtraction. Unfortunately, this approach tends to have difficulties due to alignment issues, and is particularly problematic when the background varies such as in front of a crowd or moving display.

Furthermore, post-production approaches such as rotoscoping may be employed, where as the boundary between an object and the background is defined though manual operations. This is a time consuming approach operationally with application that are limited to pre-produced content.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

The present embodiments will now be described with reference to the accompanying drawings. In the drawings, like reference numbers may indicate identical or functionally similar elements.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

An event, such as a sporting contest, a musical concert, a speech, television sitcom, or a television reality show to provide some examples, may be viewed by an actual viewer that is physically present to observe the occurrence of the event or by a remote viewer. The remote viewer observes a video depicting the event using a television platform, an internet platform, a mobile platform, or any other suitable platform that is capable of displaying the video. The video includes one or more video scenes which are provided to the remote viewer by a broadcaster. The video may be broadcast near live as the event is happening in real-time, or may be a delayed broadcast occurring after the event is complete. The one or more video scene captures the event for the remote viewer as the event occurs and may be overlaid with virtual graphics to enhance observation of the event by the remote viewer. One such exemplary video scene that may be produced by the broadcaster is illustrated in FIG. 1.

Figure 1:
FIG. 1 illustrates an exemplary video scene according to an exemplary embodiment of the present invention.

FIG. 1 illustrates an exemplary video scene according to an exemplary embodiment of the present invention. A video scene 102 illustrates a hockey scene from a hockey contest that is recorded onto video. However, the video scene 102 is not limited to the hockey scene as illustrated in FIG. 1, those skilled in the relevant art(s) will recognize the video scene 102 may depict any other suitable video scene, such as a video scene from a different sporting contest or any other event that may be recorded onto the video such as a musical concert, a speech, television sitcom, or a television reality show to provide some examples, without departing from the spirit and scope of the present invention.

The broadcaster of the event typically overlays one or more virtual graphics onto the video depicting the event to produce the video scene 102. These virtual graphics represent graphical images that are seen or visualized by the remote viewer of the video scene 102; however, these graphics remain unseen or hidden to the actual viewer. The broadcaster may be a traditional provider of television channels such as a television network or a cable company, or any other suitable provider of video to multiple recipients, such as video over the web.

The one or more virtual graphics overlay the video depicting the event in fixed locations and contain relevant information pertinent to the event. A first type of virtual graphic represents a static graphic 104 that is displayed to the remote viewer on a permanent or semi-permanent basis during the event. For example, the static graphic 104 may display a score of the hockey contest, period of the hockey contest, and time left in the period. A second type of virtual graphic represents a dynamic graphic 106 that contains information that is displayed to the remote viewer on a periodic basis that may appear and disappear during the event. For example, the dynamic graphic 106 may display time left in a power play. A third type of virtual graphic represents a realistic graphic 108 that is realistically rendered and mixed to appear, to the remote viewer, as part of the event. For example, the realistic graphic 108 may display advertisements appearing on the perimeter hockey glass to the remote viewer.

As shown in FIG. 1, a physical location the dynamic graphic 106 overlaps a physical location of the realistic graphic 108. The placement of the dynamic graphic 106 and the realistic graphic 108 onto the video depicting the event appears realistic in an overlap region to the remote viewer, namely the dynamic graphic 106 appears to be in front of the realistic graphic 108 in the video scene 102. As illustrated by the video scene 102, the dynamic graphic 106 may be overlaid into the video scene 102 after the realistic graphic 108 to give the video scene 102 this realistic appearance. However, if the order of the overlay is reversed, namely the dynamic graphic 106 was overlaid onto the video depicting the event before the realistic graphic 108, the realistic graphic 108 would occlude the dynamic graphic 106 and hence the video scene 102 would have an unrealistic appearance to the remote viewer. This invention permits the integration of the realistic graphic 108 into the video after the dynamic graphic 106 such that the realistic graphic 108 appears to be integrated into the video prior to the dynamic graphic 106.

A complex background 110 present within the onto the video depicting the event precludes the use of conventional occlusion techniques to properly overlay the realistic graphic 108 and the dynamic graphic 106 to give this realistic appearance to the remote viewer. The complex background 110, upon which the realistic graphic 108 is overlaid, represents a region of the onto the video depicting the event that is characterized as having an inconsistent color signature as is necessary for the conventional occlusion techniques. In the hockey scene depicted in the video scene 102, the complex background 110 represents the actual viewers seated behind the perimeter hockey glass upon which the realistic graphic 108 is to be overlaid. The color signature produced by the actual viewers of the event varies during the course of the hockey contest.

The conventional occlusion techniques may be used to integrate realistic virtual graphics into the video depicting the event for a simple background 112. The simple background 112 represents a region of the video depicting the event that is characterized as having a consistent color signature which may be used by the conventional occlusion techniques to integrate realistic virtual graphics. In the hockey scene depicted in the video scene 102, the simple background 112 represents a portion of the ice upon which the virtual graphics may be overlaid by the conventional occlusion techniques. However, these techniques may not apply in complex backgrounds, such as complete background 110 to provide an example, because the movement within this region, such as movement of spectators in this region, and color variation within this region, such as color variations of the spectators themselves, may cause inconsistencies in color signature. As a result, the conventional occlusion techniques may not properly integrate the realistic virtual graphics into these regions to give the realistic appearance to the remote viewer. In this situation, the virtual graphics may be inserted without occlusion, but the graphics will be overlaid in front of objects, such as the static graphic 104, the dynamic graphic 106, and/or the hockey players 114 to provide some examples, that may appear in the insertion region, again giving an unrealistic appearance to the remote viewer.

Figure 2:
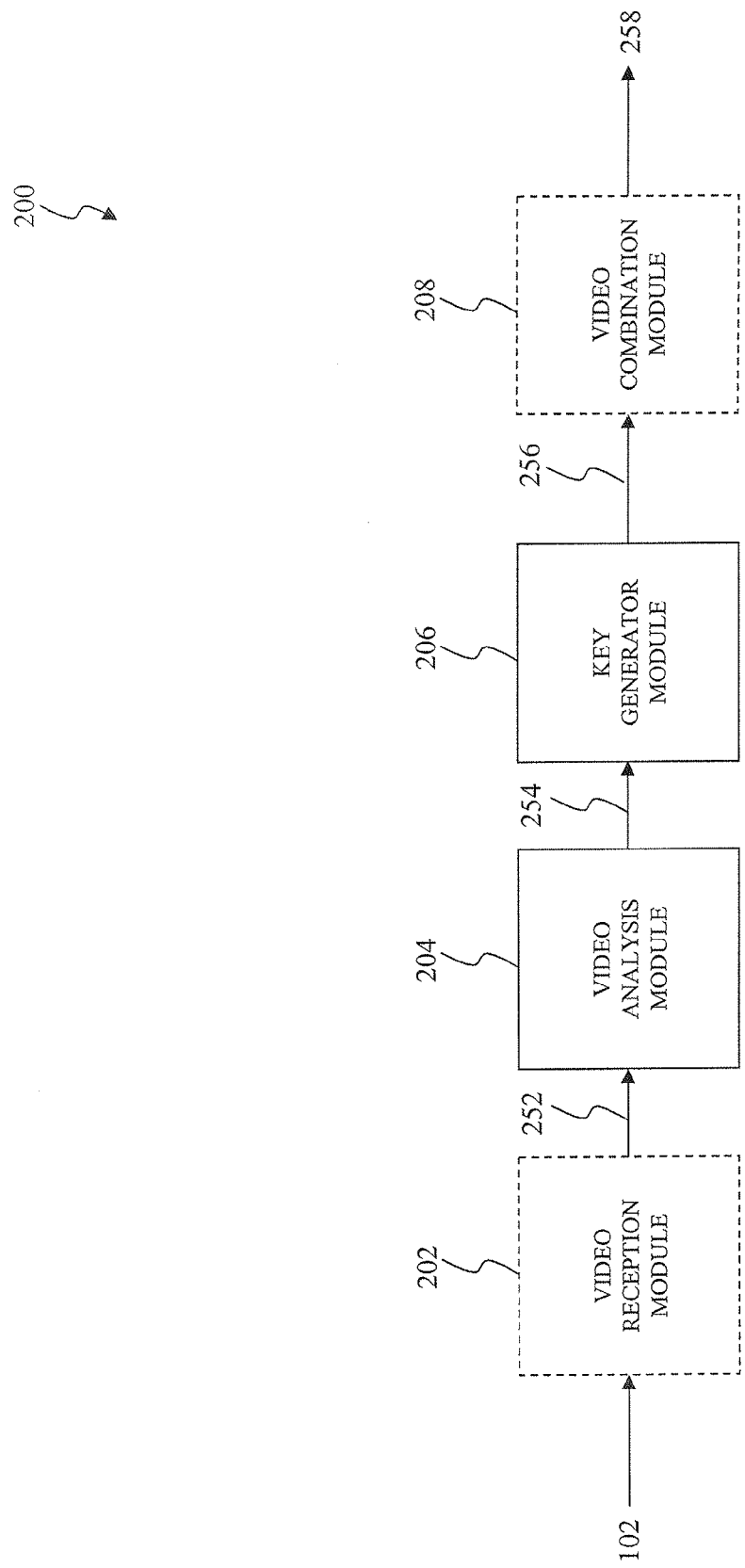
FIG. 2 illustrates a first block diagram of a suppression key generation system according to an exemplary embodiment of the present invention.

FIG. 2 illustrates a first block diagram of a suppression key generation system according to an exemplary embodiment of the present invention. A suppression key generation system 200 generates a suppression key that may be used to suppress regions in a video depicting the event for the integrating of realistic virtual graphics into the video depicting the event to produce the video scene 102. The suppression key allows for proper integrating of the realistic virtual graphics into the video depicting the event to provide the realistic appearance of these virtual graphics to the remote viewer. Alternatively, the suppression key may represent an extraction key that is used to extract a foreground object such as the static graphic 104, the dynamic graphic 106, and/or the hockey players 114 to provide some examples, from the video depicting the event, and render this foreground object into another video scene. For example, as shown in FIG. 1, the suppression key allows for the proper placement of the dynamic graphic 106 and/or the realistic graphic 108 onto the video depicting the event to appear realistic in the video scene 102 to the remote viewer. The suppression key generation system 200 includes a video analysis module 204, a key generator module 206, and, optionally, a video reception module 202 and/or a video combination module 208. The video reception module 202, the video analysis module 204, the key generator module 206, and/or the video combination module 208 may be implemented in hardware or as software routines that are executed on one or more processors.

The video reception module 202 receives a region of interest 252 within the video depicting the event. The region of interest may represent one or more regions of the video depicting the event. The region of interest 252 may be a fixed screen area, such as the complex background 110 or the simple background 112, that is bounded by a polygon, a curved shape fixed to the video scene 102, or any other suitable region of the video scene 102 that will be apparent to those skilled in the relevant art(s) from the teachings herein without departing from the spirit and scope of the present invention. The region of interest 252 may be tied to a physical scene that is depicted in the video such as a virtual insertion region or a physical scene, or a portion thereof, that is in view to the remote viewers to provide some examples. Alternatively, the region of interest 252 may be a video image, such as a field or a frame to provide some examples, in its entirety. In an additional alternate, the region of interest 252 may represent one or more images, or one or more portions thereof, from among a sequence of images that comprise the video depicting the event. The one or more images of a video sequence may be one or more fields or frames of the video sequence. The region of interest 252 may be one or more fixed location within a particular field or frame or image. The region of interest 252 may be tied to an approximate location of objects or groups of objects that move around a scene.

The video analysis module 204 determines through spatial means a presence of a dynamic object within the region of interest 252 to provide a dynamic object indicator 254. The dynamic object may be characterized as a static graphic in a fixed location within the video scene 102, which appears/disappears to the remote viewers and updates, such as the static graphic 104 to provide an example. This form of the dynamic object may be represented by the score of the hockey contest, the period of the hockey contest, and the time left in the period. Alternatively, the dynamic object may be characterized as a dynamic moveable graphic that may appear to move, namely, to expand and/or contract, across the video scene 102 to the remote viewers, such as the dynamic graphic 106 to provide an example. In the hockey scene depicted in the video scene 102, this form of the dynamic object may be represented by the time left in the power play. In another alternate, the dynamic object may be characterized as a dynamic graphic, such as the dynamic graphic 106 to provide an example, that appears to be physically present in the scene such that it pans into and out of view of the remote viewers. In a further alternate, the dynamic object may be characterized as a physical object that is physically present at the event, that is, capable of being seen by the actual viewers of the event, such as the hockey players 114, their associated equipment, or a scoring object to provide some examples. In a yet further alternate, the dynamic object may be characterized as a dynamic graphic, such as the dynamic graphic 106 to provide an example, that may include a realistic virtual graphic.

The determination of the video analysis module 204 may be manually made by an operator reviewing a spatial presentation of the region of interest 252 who manually signals whether the dynamic object is present using an input device or who electronically triggers a tally signal from a video switcher or graphics engine. Alternately, the determination may be automated using image processing matching techniques, examples of which are described below in FIG. 3 and FIG. 4, and may additionally involve defining the screen position or shape of the object. In another alternate, the determination may be made by a hybrid method combining the manual detection and the automated detection.

The key generator module 206 provides a suppression key 256 in response to the dynamic object indicator 254. The suppression key 256 may represent one or more key values corresponding to the dynamic object when the dynamic object indicator 254 indicates the presence of the dynamic object within the region of interest 252. Alternatively, the suppression key 256 may represent a default value when the dynamic object indicator 254 indicates the absence of the dynamic object within the region of interest 252. In one embodiment, the suppression key 256 sequence for the region of interest 252 has a frame by frame correspondence to the video scene 102. In another alternate, the suppression key 256 may be pre-determined to match expected virtual graphics.

In a further alternate, the suppression key 256 may use alternate representations suitable for keying, mixing, blending, overlapping, and/or cropping of graphics together, video channels together, or a combination of graphics and video. Additional alternate forms of the suppression key 256 may include alpha channel, depth map, bitmask, grayscale mask, polygon shape, contour boundary of an object, outline of an object, or any other suitable form that will be apparent to those skilled in the relevant art(s) without departing from the spirit and scope of the present invention. These alternate representations of the suppression key 256 may be considered a suppression key.

In a yet further alternate, the suppression key 256 may represent an extraction key that is used to extract a foreground object within the region of interest 252, and render this foreground object into another video sequence. For example, a person may be embedded into a scene to appear to be interacting with other people that are physically captured in the video sequence. This may be useful in live events, where it is valuable for announcers to interact with commentators or participants of the event, but there is not sufficient time to move between locations. Alternately, a commentator may be able to walk virtually within the event when analyzing a replay of the event.

The video combination module 208 utilizes the suppression key 256 representation to combine the region of interest 252 with a virtual graphic, combine virtual graphic together, to combine video channels together, and/or to combine a virtual graphic or multiple virtual graphic with one or more video channels to provide a video scene 258 such as the video scene 102 to provide an example.

Figure 3:
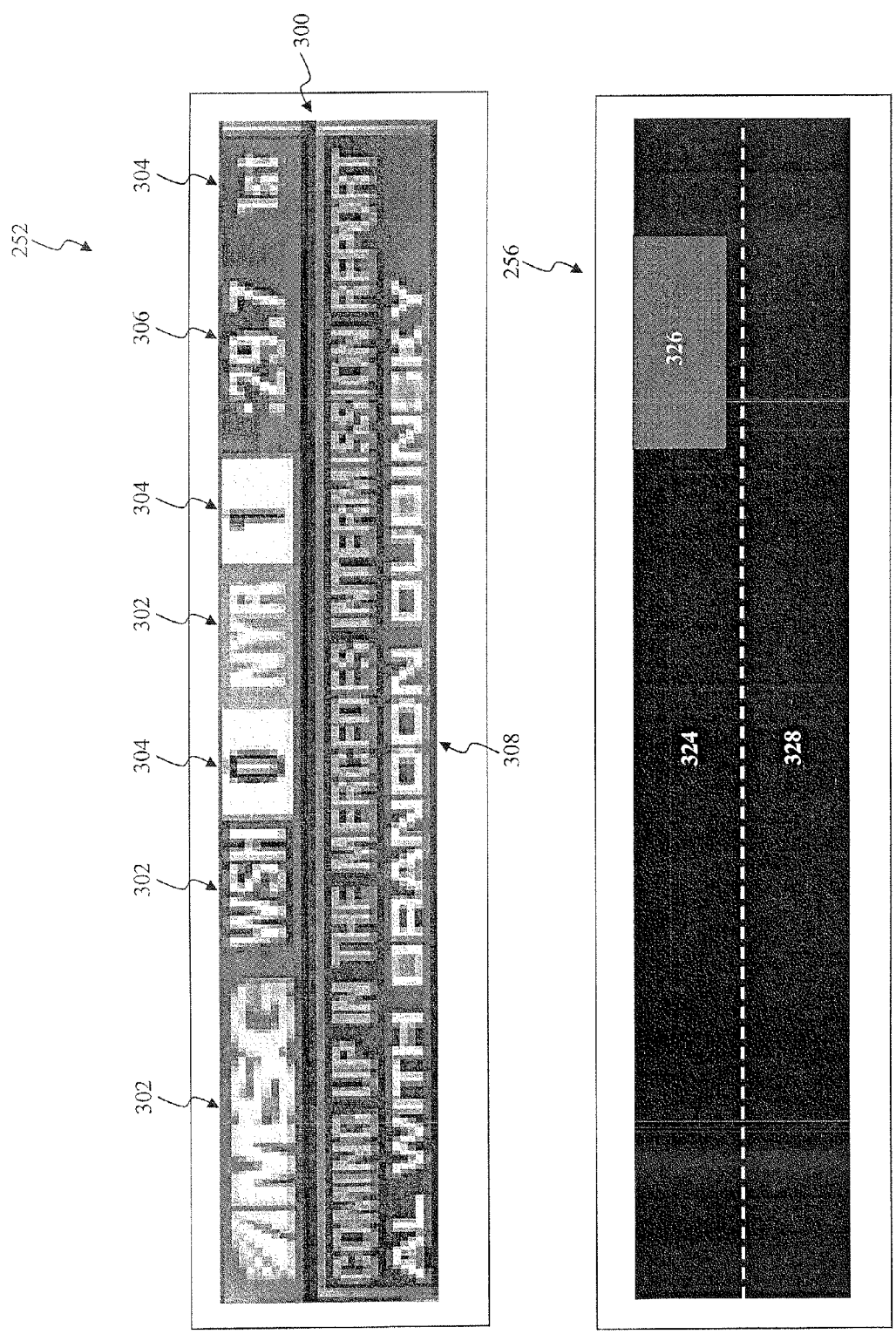
FIG. 3 illustrates a first dynamic object that is overlaid onto the video depicting the event and, upon its detection, its corresponding suppression key according to a first exemplary embodiment of the present invention.

FIG. 3 illustrates a first dynamic object that is overlaid onto the video depicting the event and, upon its detection, its corresponding suppression key according to a first exemplary embodiment of the present invention. A dynamic object 300 may be characterized as a static graphic in a fixed location within the video scene 102, such as the region of interest 252 to provide an example. The dynamic object 300 may represent an exemplary embodiment of the static graphic 104.

The dynamic object 300 may include one or more static regions 302 that are characterized as being static to the remote viewer for the entire event. The one or more static regions 302 may include a first region corresponding to the broadcaster, denoted MSG in FIG. 3, and a second and a third region corresponding to the participants in the hockey contest, denoted WSH and NYR in FIG. 3.

The dynamic object 300 may additionally include one or more periodic regions 304 that are characterized as being periodically updated to the remote viewer during the event. The one or more periodic regions 304 may include a first region corresponding a score of the participants in the hockey contest, denoted as 0 and 1 in FIG. 3, and a second region corresponding to the period of the hockey event, denoted as 1st in FIG. 3.

The dynamic object 300 may further include one or more frequently updating regions 306 that are characterized as being frequently updated to the remote viewer during the event. The one or more frequently updating regions 306 may include a region corresponding to a remaining time in the period of the hockey contest, denoted as ":29.7" in FIG. 3.

The dynamic object 300 may yet further include one or more temporary regions 308 that are characterized as temporarily appearing to the remote viewer. The one or more temporary regions 308 may include a region corresponding to an upcoming announcement for the event, denoted as COMING UP IN THE MERCEDES INTERMISSION REPORT AL WITH BRANDON DUBINSKY in FIG. 3. The dynamic object 300 may include any combination of the one or more static regions 302, the one or more periodic regions 304, and/or the one or more temporary regions 308.

The video analysis module 204 may utilize automated detection methods to detect the presence of the dynamic object 300 within the region of interest 252. These automated detection methods may favor the use of the static regions 302 and/or the periodic regions 304 over the temporary regions 308 because the video analysis module 204 may search the region of interest 252 for a single pattern for an extended period of time. The video analysis module 204 may utilize a vision processing algorithm to train the automated detection methods on the dynamic object 300, or portions thereof, before and/or during the event to generate a spatial model of the dynamic object 300. However, this example is not limiting, those skilled in the relevant art(s) will recognize other spatial models represent any other suitable object are possible that will be apparent to those skilled in the relevant art(s) from the teachings herein without departing from the spirit and scope of the present invention. The spatial model of the dynamic object 300 may include one or more reference images corresponding to a pixel-by-pixel mapping of at least one of the static regions 302, the periodic regions 304, and/or the temporary regions 308 and its intended location within the region of interest 252. The video analysis module 204 may make a pixel-by-pixel spatial comparison between the one or more reference images in the spatial model and the region of interest 252 during the event to determine the presence of the dynamic object 300. The video analysis module 204 determines the dynamic object 300 to be present when the region of interest 252, or a portion thereof, substantially matches the one or more reference images in the spatial model. In some embodiments, the spatial model of the dynamic object 300 includes a spatial color model with or without the one or more reference images.

The one or more reference images stored may retain one or more channel color spaces values, such as three channel color space values, for example, RGB, YUV, HSV, etc., to provide an example, one or more channel chroma values, and/or may be a single channel intensity or luma image. The one or more reference images may represent full video fields or frames or some region of interest within the full video field or frame. The one or more reference images may be subject to image processing techniques including, but not limited to, contrast stretching, histogram or other normalization, edge enhancement, zero mean or other suitable filtering technique such as high pass, band pass, and/or low pass filtering, that will be apparent to those skilled in the relevant art(s) without departing from the spirit and scope of the present invention. This one or more reference images may be templates used for correlation comparison or other types of matching techniques. The one or more reference images may be scaled or expanded representations of captured images.

Alternatively, the spatial model of the dynamic object 300 may include one or more reference images corresponding to a color distribution for at least one of the static regions 302, the periodic regions 304, and/or the temporary regions 308 and its intended location within the region of interest 252. In this alternate, the video analysis module 204 may make a color comparison between the one or more reference images in the spatial model and the region of interest 252 during the event to determine the presence of the dynamic object 300. The video analysis module 204 determines the dynamic object 300 to be present when the color distribution of the region of interest 252, or a portion thereof, substantially matches the color distribution of the reference images in the spatial model. In another alternative, the video analysis module 204 may compute object features in the one or more reference images from the spatial model of the dynamic object 300. These object features may be extracted from the region of interest 252 and matched to the spatial model of the dynamic objects 300 to identify the presence of the dynamic object 300 in the region of interest 252. In a further alternative, the video analysis module 204 may utilize character recognition to validate the presence of the dynamic object 300. In a yet further alternative, the video analysis module 204 may compare the one or more reference images in the spatial model with the region of interest 252 to generate a suppression key on a field basis. In a yet further alternative, the dynamic object 300 may be dynamic as in the case of a DVE, and a spatial-temporal extension to the above techniques may be employed to detect the dynamic object 300 appropriately over time.

The object features may be characterized as salient features of an object that were extracted from the one or more reference images. These salient features may include scale-invariant descriptors such as keypoints or image templates to provide some examples. The object features may be extracted from the region of interest 252 and matched to a database of features in an object model of the dynamic object 300 that is derived from the one or more reference images. The strength of the matching as well as the matched feature locations may be used to determine the presence of the dynamic object 300 within the region of interest 252. Detection of the object features may employ a variety of techniques such as edge detection, line detection, boundary detection, blob detection, corner detection, and/or any other suitable detection process that will be apparent to those skilled in the relevant art(s) without departing from the spirit and scope of the present invention. The location and nature of these detected features may be used to determine the presence of the dynamic object 300 in the region of interest 252. The object model may include the image processing thresholds or algorithm settings to perform these aforementioned detection techniques. The image processing thresholds or algorithm settings may be determined using the one or more reference images, but are not necessarily derived from the images themselves. The object model, the spatial model, and/or the spatial color model may include the object features, the image processing thresholds, and/or the algorithm settings.

The key generator module 206 provides the suppression key 256 corresponding to the dynamic object 300 upon its detection within the region of interest 252. The suppression key 256 represents a region within the video scene 102 that is to be suppressed allowing for the integrating of virtual graphics into this suppressed region and/or extracted from the region of interest 252 and merged into another region of interest or another video scene. For example, pixels corresponding to the dynamic object 300 within the suppression key 256 may be assigned a value of a large value, representative of the color black, to allow for suppression other graphics, such as the realistic graphic 108 to provide an example, that overlap the intended location of the dynamic object 300 in the video scene 102. As another example, the pixels corresponding to the dynamic object 300 within the suppression key 256 may be assigned a small value representative of the color white. As a further example, the pixels corresponding to the dynamic object 300 within the suppression key 256 may be assigned any suitable value between the large value and the small value that will be apparent to those skilled in the relevant art(s) without departing from the spirit and scope of the present invention.

The suppression key 256 may include multiple suppression regions such as a first suppression region 324, a second suppression region 326, and a third suppression region 326 to provide some examples. Those skilled in the relevant art(s) will recognize that the suppression key 256 may include a lesser or a greater number of suppression regions without departing from the spirit and scope of the present invention. The pixels of each of the multiple suppression regions of the suppression key 256 may be assigned to similar and/or dissimilar values. For the example illustrated in FIG. 3, pixels of the first suppression region 324 are assigned to a first value, typically a small value representative of approximately zero percent opacity, to allow for suppression of other graphics that overlap the intended location of the one or more static regions 302, and the one or more periodic regions 304. Pixels of the second suppression region 326 are assigned to a second value, typically a smaller value representative of less than approximately one hundred percent opacity, to allow for suppression, or a partial suppression, of the other graphics that overlap the intended location of the one or more frequently updating regions 306. Pixels of the third suppression region 328 are assigned to a third value, typically a small value representative of approximately zero percent opacity, when the temporary regions 308 are present in the video scene 102 or to a fourth value, typically a large value representative of approximately one hundred percent opacity, when the temporary regions 308 are no longer present in the video scene 102. In this embodiment, opacity value near zero may represent areas for suppression and opacity values near one hundred percent may represent areas without suppression. In alternate embodiments, the convention of near one hundred percent opacity may be used in regions of suppression, and near zero percent opacity for regions with minimal suppression.

In an exemplary embodiment, sample instances of virtual graphics with their appropriate location in the video scene 102 may be obtained before and/or during the event, and the suppression key 256 may be generated from a polygon region manually positioned around the graphic location. In another embodiment, the suppression key 256 can be generated by detecting the boundary colors of the dynamic object 300, or its regions, or by manually tracing the outline of the dynamic object 300, or its regions, and flood-filling the internal holes in the dynamic object 300, or its regions. In yet another embodiment, the suppression key 256 may be formulated heuristically by comparing pixel color in the dynamic object 300, or its regions, to the color outside of the dynamic object 300, or its regions, and assigning a highest key value to pixels that mostly differ from the pixels outside of the dynamic object 300. In further embodiments, the suppression key 256 may represent a complex decal that is generated off-line and stored as a bitmap, and retrieved for run-time operation.

Figure 4:
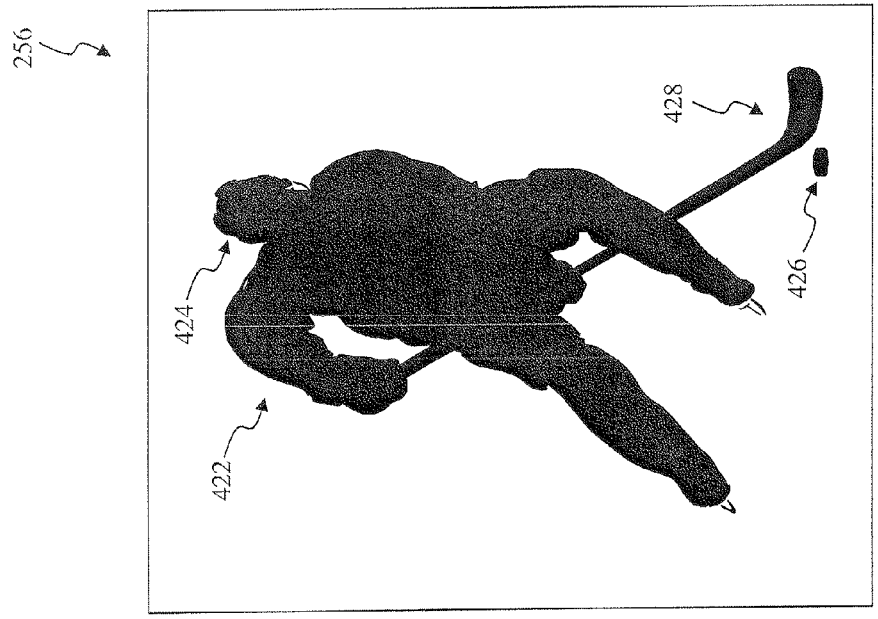
FIG. 4 illustrates a second dynamic object that is in the video scene and, upon detection, its corresponding suppression key according to a second exemplary embodiment of the present invention.
Figure 4:
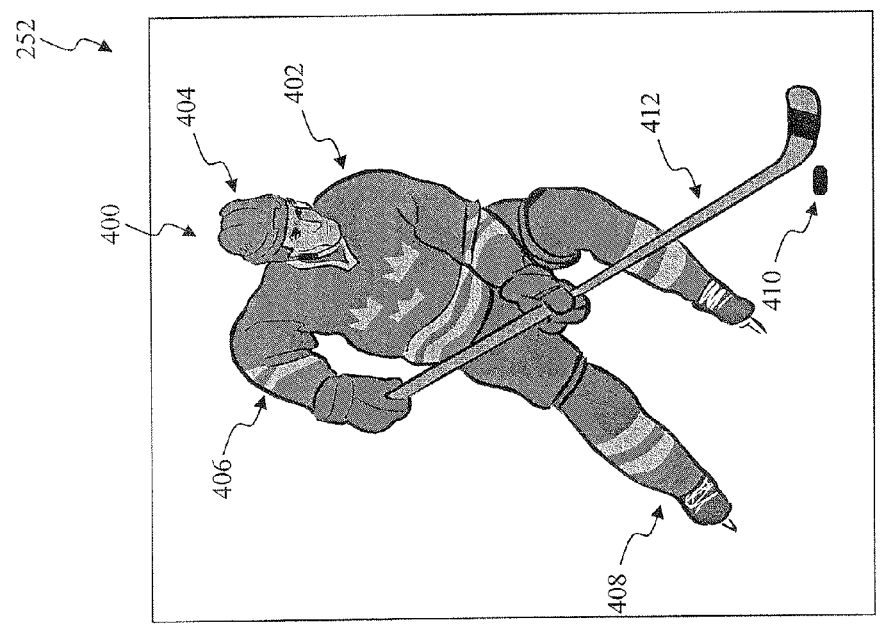

FIG. 4 illustrates a second dynamic object that is in the video scene and, upon detection, its corresponding suppression key according to a second exemplary embodiment of the present invention. The region of interest 252 may include a dynamic object 400 that is physically present within the video scene 102 in its entirety or within the region of interest 252 to provide an example. The dynamic object 400 represents an object such as one of the hockey players 114 to provide an example, which is capable of being seen by the actual viewers of the event.

The video analysis module 204 may utilize automated techniques to detect object components of the physical object 400, or portions thereof. These automated techniques may include torso detection 402, helmet detection 404, limb detection 406, skate detection 408, puck detection 410, stick detection 412, and/or any other suitable technique to detect an object component of the physical object 400, or portions thereof, that will be apparent to those skilled in the relevant art(s) without departing from the spirit and scope of the present invention. The automated techniques for helmet detection 404 and limb detection 406 are well known in the art and will not be described in further detail. The automated techniques for torso detection 402, puck detection 410, and stick detection 412 are further described in U.S. patent application Ser. No. 12/403,857, filed on Mar. 13, 2009, which is incorporated by reference herein in its entirety, and will not be described in further detail.

Each of the object components of the physical object 400, such as the torso, the helmet, the limbs, the skates, the puck, and the stick to provide some examples, may be represented using a spatial color model with appropriate size and shape characteristics dependent on a distance of these objects from a viewing camera. The color representation in a spatial color model may vary with spatial positioning. In an exemplary embodiment, the color representation may be a histogram distribution according to color values. The video analysis module 204 may utilize a vision processing algorithm to train a collection of spatial color models to represent participants of the event, such as an organized team sport, such as hockey, to provide an example, before and/or during the event. The collection of spatial color models may be formulated in such a way that it varies spatially, such as a vertical direction, an inner region versus boundary, or any other suitable spatial relationship that will be apparent to those skilled in the relevant art(s) without departing from the spirit and scope of the present invention. In an exemplary embodiment, an operator will initiate training of the collection of spatial color models by manually selecting the dynamic object 400 within the region of interest 252 through a method such as a rubber-band box to provide an example. In another exemplary embodiment, foreground color training may be achieved by detecting foreground object in regions from the region of interest 252 that are expected to have constant background color. In a further embodiment, color segmentation algorithms may segment the region of interest 252 into multiple regions, which are then separated from pre-trained background colors from the collection of spatial color models to form an outline of the physical object 400. These spatial color models may be considered spatial models. In yet a further embodiment, manual selection of colors at the boundary of the object may be combined with an edge detection scheme to foam the outline of the physical object 400.

The key generator module 206 provides the suppression key 256 upon detection of the dynamic object 400 within the region of interest 252. The key generator module 206 applies the collection of spatial color models to color regions within the region of interest 252 during the event and detects the dynamic object 400 as being present within the region of interest 252 when a sufficient number and distribution or spatial extent are present.

The suppression key 256 represents a suitable key or mask that allows the physical object 400, such as the hockey player 114 to provide an example, to be extracted from the region of interest 252 and merged into another region of interest or another video scene. The suppression key 256 includes one or more regions from multiple detected components, such one or more of a player silhouette 422, a helmet silhouette 424, a puck silhouette 426, and/or a stick silhouette 428 to provide some examples. The suppression key 256 may include a first value, typically a large value representative of approximately one hundred percent opacity, corresponding to the physical object 400, namely the player silhouette 422, the helmet silhouette 424, the puck silhouette 426, and the stick silhouette 428. In this embodiment, the area of suppression corresponds to this small value. The suppression key 256 may include a second value, typically a high value, corresponding to a remainder of the region of interest 252 not including the physical object 400. In this embodiment, the area without suppression corresponds to a high value.

In an exemplary embodiment, the video analysis module 204 may not be able to detect all of the pixels of the physical object 400. In this embodiment, the key generator module 206 uses a fills these missing pixels in the suppression key 256 using a mask fill process such as flood-fill, morphological operations, or any other suitable process that will be apparent to those skilled in the relevant art(s) without departing from the spirit and scope of the invention. In another exemplary embodiment, the video analysis module 204 may optionally use an edge detector to reconstitute the boundary of the dynamic object 400 prior to the mask fill process. In a further exemplary embodiment, the video analysis module 204 may detect the boundary of the dynamic object 400 and track this boundary over time. In a yet further exemplary embodiment, the video analysis module 204 may detect the dynamic object 400 in a complex region, such as the complex background 110 to provide an example, using only a portion of the physical object 400, such an upper torso and/or a head of the dynamic object 400 to provide an example. In this exemplary embodiment, the video analysis module 204 may detect the dynamic object 400 in less complex regions, such as the simple background 112 to provide an example, using a combination of object modeling and conventional occlusion techniques. For example, the region of interest 252 may be positioned high on the perimeter hockey glass in a broadcast of a hockey contest where a portion of the physical object 400, such as tops of the helmets of the hockey participants, arms of the hockey participants, the sticks of the hockey participants to provide some examples, may occlude. In a further exemplary embodiment, criteria used by the video analysis module 204 for the dynamic object 400 may be made progressively stringent, for example toward a top of the region of interest 252, based on a likelihood that the dynamic object 400 is present.

Figure 5:
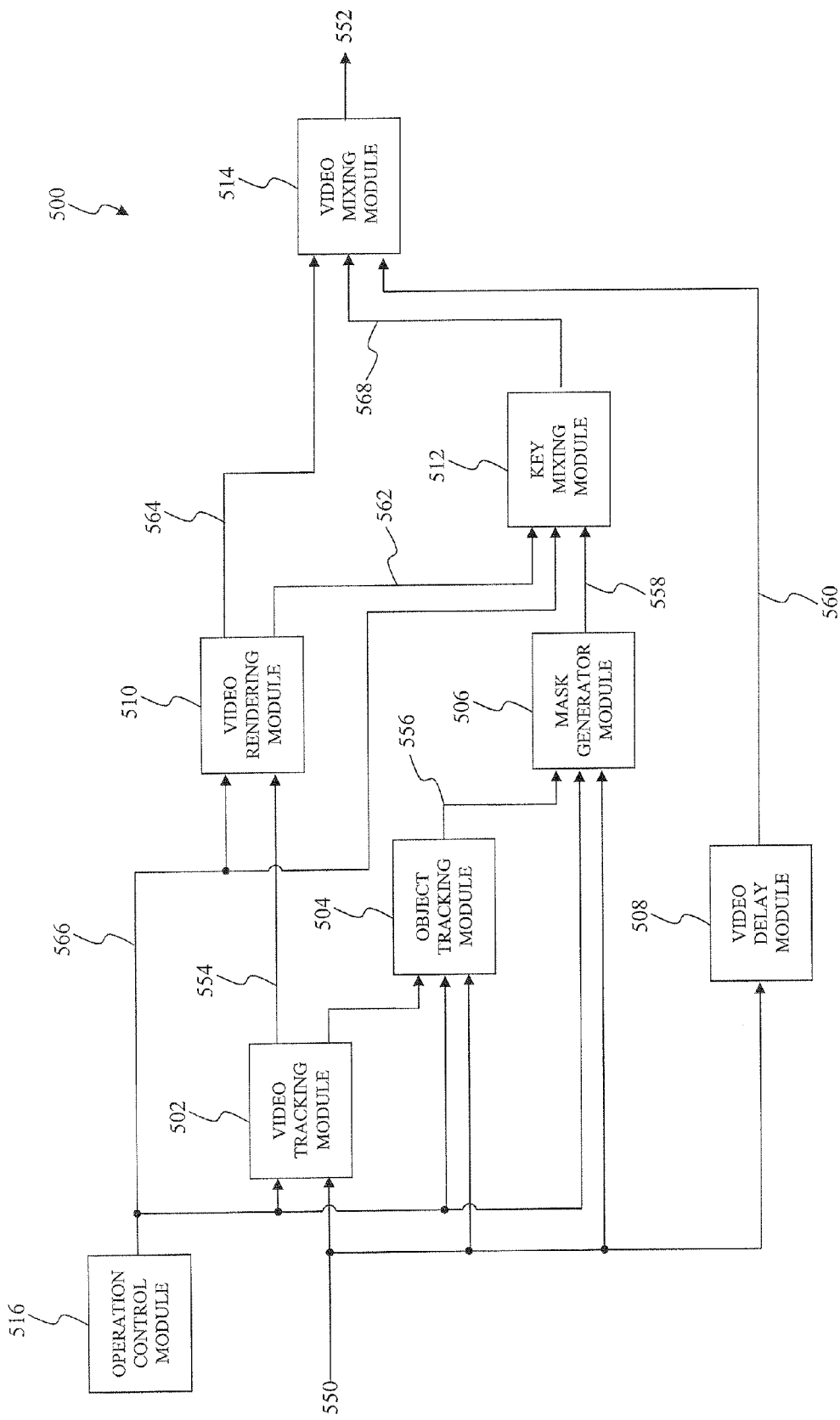
FIG. 5 illustrates a block diagram of a video insertion system according to an exemplary embodiment of the present invention.

FIG. 5 illustrates a block diagram of a video insertion system according to an exemplary embodiment of the present invention. A video insertion system 500 integrates realistic virtual graphics into a video feed 550 and/or overlays graphics onto the video feed 550 to provide a video scene 552. The video feed 550 represents one or more video frames of an event, such as the hockey contest as illustrated in FIG. 1, such as the video scene 102 to provide an example. The video insertion system 500 may be used in coordination with video production for television, internet, and mobile applications. The video insertion system includes a video tracking module 502, an object tracking module 504, a mask generator module 506, a video delay module 508, a video rendering module 510, a key mixing module 512, a video mixing module 514, and an operational control module 516.

The video tracking module 502 analyzes the video feed 550 to determine the orientation of a camera recording the event, as well as transitions between multiple cameras recording the event, to provide camera tracking data 554. The video feed 550 may be received from a video production such as a dedicated feed from the camera recording the event, or an isolated point of view of the camera, or a program feed which cuts among video from among the multiple cameras. The video tracking module 502 camera tracking data 554 may provide the camera tracking data 554 over a network such a wireless and/or wired network such as Ethernet to provide an example.

The video tracking module 502 may additionally analyze the video feed 550 for landmarks to provide a representation of the pan, tilt, and zoom (PTZ) of the video feed 550. The video tracking module 502 may provide the representation of the PTZ with respect to a location point in a scene. This representation of the PTZ may be combined with the determine the orientation of a camera recording the event, as well as the transitions between the multiple cameras recording the event, to provide a camera model representation as the camera tracking data 554. The camera model may contain multiple parameters that relate to physical measurements of a tripod mounted camera such as pan, tilt, roll, image distance, x position, y position, z position. Other parameters, such as parameters for radial lens distortion for example, may be utilized. The camera model representation may be used to obtain information about the scene depicted in the video feed 550. The camera model may be additionally used to establish a mapping between data gathered in a screen space of the broadcast video and view point representation. The camera or sensor model representations may include directional measurements. Alternatively, the sensor model representation may include information corresponding to objects or locations in an image or video.

The video tracking module 502 may further update a camera position, or the position of the multiple cameras, over time through frame to frame analysis of features in the video, such as a texture analysis method as described in U.S. patent application Ser. No. 08/580,892, filed on Dec. 29, 1995, now U.S. Pat. No. 5,808,695, and U.S. patent application Ser. No. 09/308,949, filed on May 26, 1999, now U.S. Pat. No. 6,529,613, each of which is incorporated by reference herein in its entirety. Alternatively, the video tracking module 502 may rely on PTZ sensors on the camera or a combination of sensors and image stabilization as described in U.S. patent application Ser. No. 09/230,099, filed on Jan. 19, 1999, now U.S. Pat. No. 6,100,925, which is incorporated by reference herein in its entirety.

The object tracking module 504 may detect and/or track virtual graphics and/or physical objects. The physical objects represent objects within the event that are capable of being viewed by the actual viewer, such as the dynamic object 400 to provide an example, that are depicted in the video feed 550. The virtual graphics represents graphics within the event that are capable of being viewed by the remote viewer, such as the static graphic 104, the dynamic graphic 106 and/or the realistic graphic 108 to provide some examples, which were previously overlaid into the video feed 550.

The object tracking module 504 provides object tracking information 556 indicative of whether the virtual graphics and/or the physical objects have been detected and, optionally, their location within the video feed 550. For example, the object tracking information 556 may indicate of a presence of the virtual graphics and/or the physical objects. The object tracking module 504 may detect and/or track static and/or dynamic objects, and/or portions thereof, such as the dynamic object 300, the dynamic object 400, and/or another other suitable dynamic object that will be apparent to those skilled in the relevant art(s) from the teachings herein without departing from the spirit and scope of the present invention. The object tracking module 504 may automatically detect and/or track static and/or dynamic objects, and/or portions thereof, in a simple background such as the simple background 112 to provide an example as described in U.S. patent application Ser. No. 12/403,857, filed on Mar. 13, 2009, which is incorporated by reference herein in its entirety, as well as static and/or dynamic objects, and/or portions thereof, in a complex background such as the complex background 110.

The mask generator module 506 creates a suppression key 558 that corresponds to the shape and location of the virtual graphics and/or the physical objects in response to the object tracking information 556 indicating their presence. The mask generator module 506 represents an exemplary embodiment of the suppression key generation system 200 as discussed above. As such, the mask generator module 506 may include the video analysis module 204, the key generator module 206, and, optionally, the video reception module 202.

The video delay module 508 provides a pipe-line delay to the video feed 550 to compensate for the processing of the video tracking module 502, the object tracking module 504, mask generator module 506, and the video rendering module 510 to provide a delayed video feed 560. The video delay module 508 delays the video feed 550 for a sufficient duration to allow the video tracking module 502, the object tracking module 504, mask generator module 506, and the video rendering module 510 to appropriately process the video feed 550.

The video rendering module 510 realistically formats virtual graphics such that these virtual graphics are adjusted to match their respective locations in the scene depicted on the video feed 550 based upon the camera tracking data 554 to provide a video key 562 and a video fill 564. The video rendering module 510 may generate a graphical presentation, as the video fill 564, by rendering a graphical insert into a region of interest of the video feed 550 in a position corresponding to a physical object in the video feed 550. The graphical insert, or a portion thereof, may appear to track with the physical object, such as a ring tracking a physical object, such as one of the hockey players 114 to provide an example, or an arrow pointing to the physical object where only the point of the arrow tracks the physical object to provide some examples. The graphical insert may appear to track with a background scene of the video feed 550, such as the complex background 108 or the simple background 112 to provide some examples, and represent a path or a trail of the physical object moving across the background scene. The graphical insert may represent a three dimensional trajectory of the physical object, and appear locked in three dimensional space as the camera moves. Alternatively, the graphical insert may appear to be overlaid on the two dimensional surface of the display screen, and may appear to track with movements of the physical object. In an exemplary embodiment, telestration graphics that diagrams the movements of the physical object are integrated into the background scene of the video feed 550. In this exemplary embodiment, the suppression key 558 suppresses foreground objects, namely those objects in front of a location of the telestration graphics, within the video feed 550 so that they appear to be in front of the graphic. The telestration graphics may be positioned and/or generated, in part, based on user commands captured using a manual interface, such as a touch screen, mouse, gaming device, tablet, and/or any other suitable device that will be apparent to those skilled in the relevant art(s) without departing from the spirit and scope of the present invention.

The video key mixer 512 combines the suppression key 558 with the video key 562 to provide a suppressed video key 568.

The video mixer 514 uses the suppressed video key 568 to blend the video fill 564 with the delayed video 560 to create the video scene 552.

The operational control module 516 provides a control signal 566 to enable monitoring and/or correction of the operation of the video insertion system 500. The operational control module 516 may provide feedback of the video tracking module 502 with diagnostics overlaid on a video window. The operator controller 518 may additionally allow monitoring of the tracking information 554 with an option to select information from an object of interest from the video feed 550. The operational control module 516 may also enable the selection of graphics or statistics and the monitoring of results within the mask generator module 506 or the video rendering module 510. The operational control module 516 may further notify the mask generator module 506 of a detection of the graphics and/or the objects within the video feed 550 by the video tracking module 502.

The operational control module 516 may control the video tracking module 502, the object tracking module 504, the mask generator module 506, the video rendering module 510, and the key mixing module 512 over a network such a wireless and/or wired network such as Ethernet to provide an example. The operational control module 516 may include an operator interface that allows an operator to manually determine a location of possible on-screen graphics before and/or during the event. For example, during the event, the operator may indicate the presence of a particular graphic through a manual interface such as a key pad, a mouse, a touch screen device, and/or any other suitable device that will be apparent to those skilled in the relevant art(s) without departing from the spirit and scope of the present invention.

The video insertion system 500 may be positioned approximate to the event and/or away from the event allowing the broadcaster to remotely integrate realistic virtual graphics into the video depicting the event.

Figure 6:
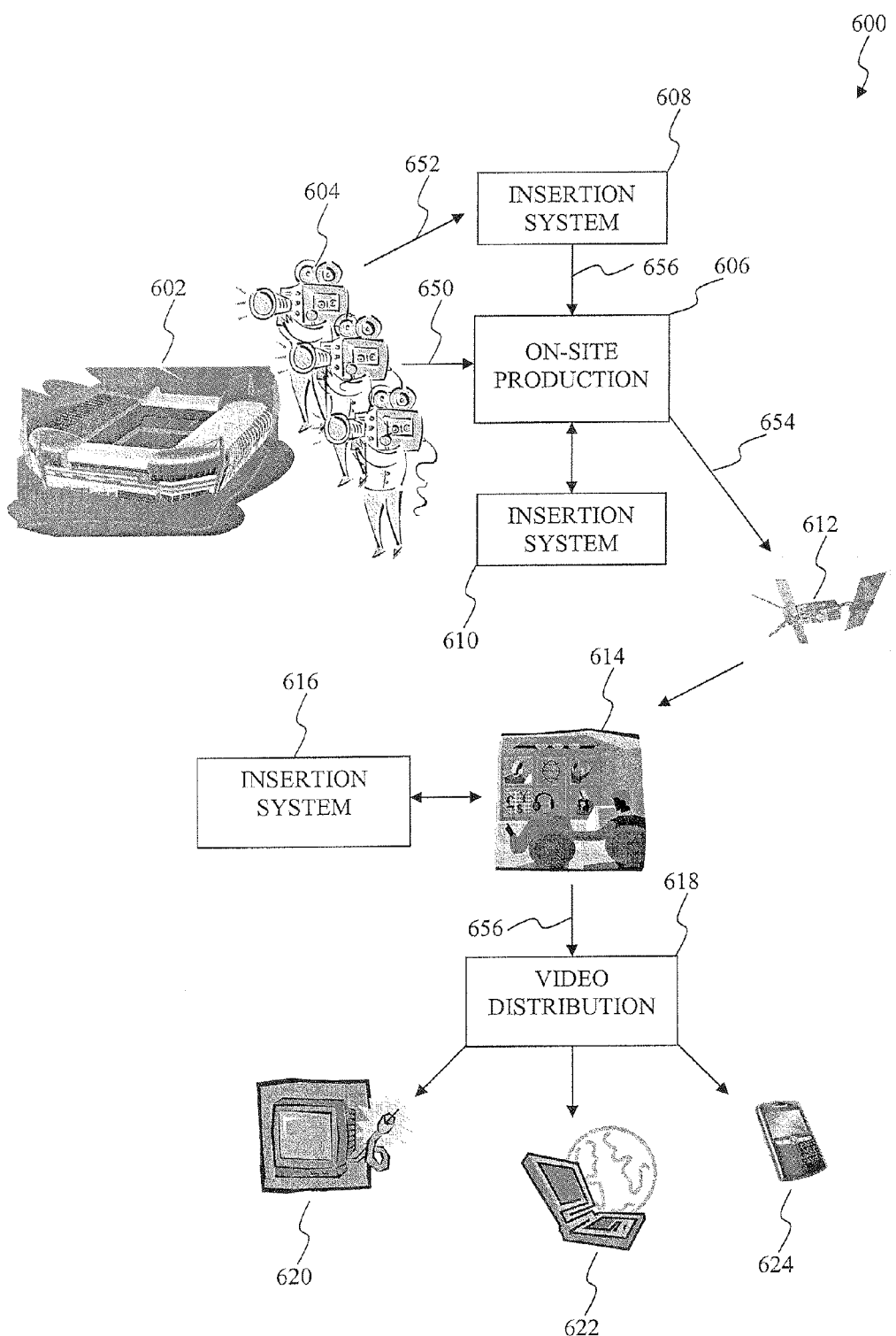
FIG. 6 illustrates a block diagram of a video pipe-line according to an exemplary embodiment of the present invention.

FIG. 6 illustrates a block diagram of a video pipe-line according to an exemplary embodiment of the present invention. A video pipe-line 600 overlays virtual graphics onto a video depicting an event to provide a video scene, such as the video scene 102 to provide an example, to one or more remote viewers. The video pipe-line 600 includes a venue 602, one or more cameras 604, an on-site production facility 606, a first insertion system 608, a second insertion system 610, a transmission medium 612, a broadcast studio production facility 614, a third insertion system 616, and video distribution chain 618.

An event, such as the hockey contest depicted in FIG. 1, may take place at the venue 602, whereby the event is recorded onto video by the one or more cameras 604. The one or more cameras 604 may provide a corresponding video feed 650 depicting the event to the on-site production facility 606 and/or at least one of the one or more cameras 604 may, optionally, provide a dedicated video 652 to the first insertion system 608.

The on-site production facility 606, may overlay virtual graphics relating to the event, such as the dynamic object 300 to provide an example, onto one or more of the video feeds 650 to produce an event related video 654. The first insertion system 608 may integrate other realistic virtual graphics into the dedicated video 652 to provide a dedicated video 656 which is then provided to the on-site production facility 606 to be overlaid with other virtual graphics. Alternately, the on-site facility 606 may provide a video feed with or without overlaid virtual graphics to a second virtual insertion system 610, which may integrate realistic virtual graphics and may return the composite feed back to the on-site facility 606. In some embodiments, the first or second virtual insertion systems may overlay other graphics for the on-site production facility 608. The first insertion system 608 and/or the second insertion system 610 may be implemented as part of the on-site production facility 606 or external to the on-site production facility 606. The event related video 654 may include one or more of the video feeds 650 and/or the dedicated video 656, each of which has been overlaid with virtual graphics relating to the event. The on-site production facility 606 may provide camera data information, as discussed above, to insertion system 610 and/or the insertion system 612 that is extracted using instrumentation on the one or more cameras 604 or may be extracted directly by analyzing the one or more of the video feeds 650, or a combination of video analysis and camera sensors. This camera data may additionally be provided to the broadcast studio production facility 614 for use by the third insertion system 616.

The event related video 654 is sent using a transmission medium 612, such as a satellite to provide an example, to the broadcast studio production facility 614. Those skilled in the relevant art(s) will recognize that other forms for the transmission medium 612 are possible, such as other well known wired, such as coaxial cable or fiber optic to provide some examples, and/or wireless communications mediums without departing from the spirit and scope of the present invention.

The broadcast studio production facility 614 may overlay virtual graphics relating to the other events and/or other virtual graphics onto one or more of the video feeds 650 to produce a video scene 656. The video feed with or without virtual graphics may be provided to a third virtual insertion system 616, which may integrate realistic graphics and may return the composite feed back to the studio production facility 614. In some embodiments, the third virtual insertion system may overlay other graphics for the studio production facility 614. It should be noted that one or more of the first insertion system 608, the second insertion system 610, and the third insertion system 616 may represent one or more exemplary embodiments of the video insertion system 500. It should be noted that each of the first insertion system 608, the second insertion system 610, and the third insertion system 616 is for exemplary purposes only, the video pipe-line 600 may include more or less insertion systems without departing from the spirit and scope of the present invention.

The video scene 656 goes through a video distribution chain 618, where it is provided to a television platform 624, an internet platform 626, and/or a mobile platform 628.

In an exemplary embodiment, the video pipe-line 600 integrates virtual information into a video with an object based occlusion at a remote location from an on-site production using video analysis of the video. These may include but not limited to a broadcast studio, regional cable head-end, local cable head-end, cable node, set-top box, computer system, mobile device, etc. In another exemplary embodiment, this video analysis occurs at the on-site production facility 606 or at the broadcast studio production 616 and the information is propagated downstream in the distribution chain where the insertion is integrated (regional cable head-end, local cable head-end, cable node, set-top box). In a further exemplary embodiment, object detection information is sent to location remote from the event 602 to be used by the insertion system 620 integrate virtual graphics into video with occlusion.

Figure 7:
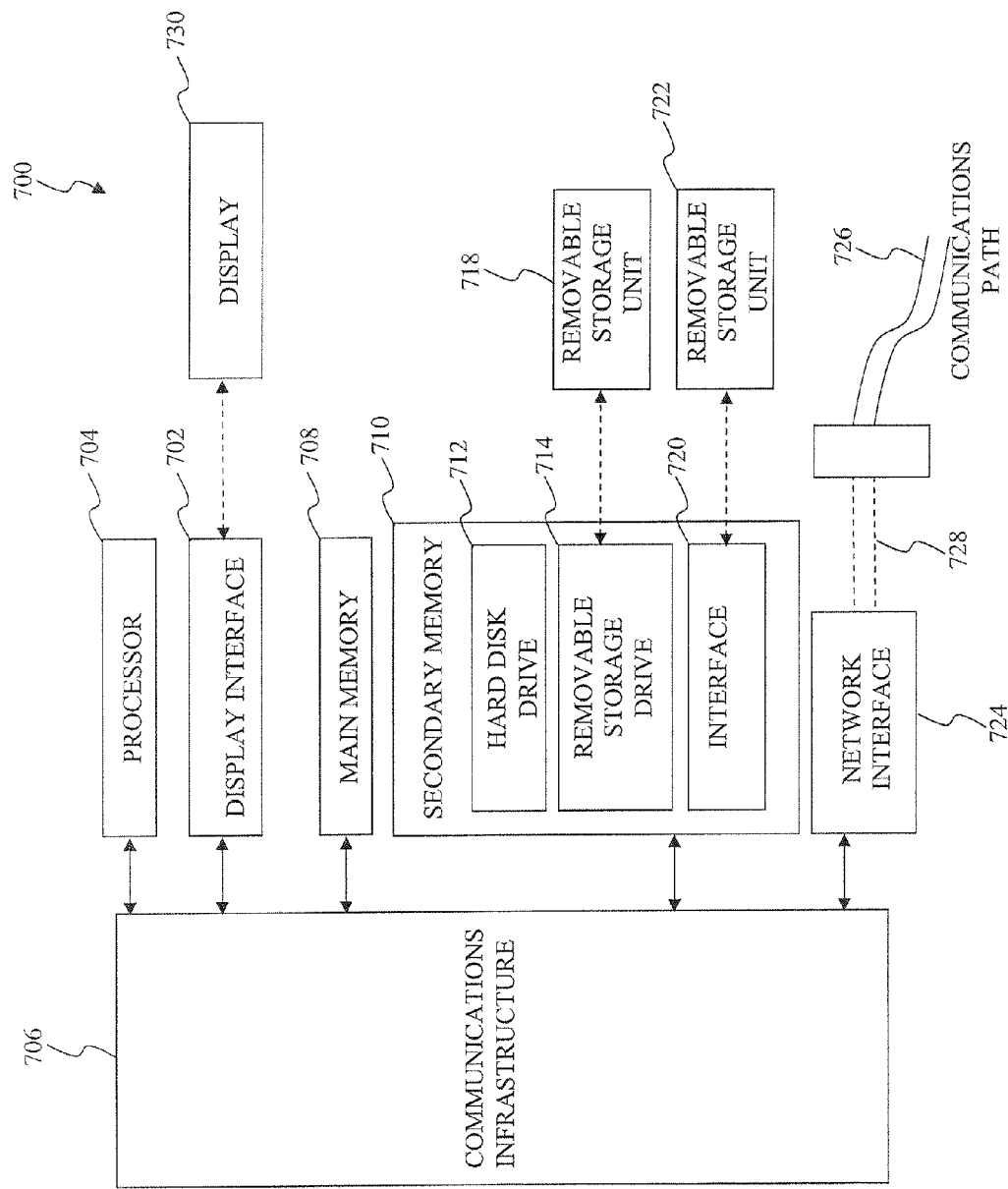
FIG. 7 is a schematic diagram of an example computer system used to integrate virtual graphics into a video depicting an event according to an exemplary embodiment of the present invention.

Various aspects of the present invention may be implemented by software, firmware, hardware, or a combination thereof. FIG. 7 is a schematic diagram of an exemplary computer system 700 used to integrate virtual graphics into a video depicting an event according to an exemplary embodiment of the present invention. For example, the suppression key generation system 200, or portions thereof, may be implemented in the computer system 700. The video insertion system 500, or portions thereof, may also be implemented in the computer system 700. Portions of the video pipe-line 600 may also be implemented in the computer system 700. Various embodiments of the invention are described in terms of this example computer system 700. After reading this description, it will become apparent to a person skilled in the relevant art how to implement the invention using other computer systems and/or computer architectures.

The computer system 700 includes one or more processors, such as processor 704. The processor 704 may be a special purpose or a general-purpose processor. The processor 704 is connected to a communication infrastructure 706, such as a bus or a network to provide some examples.

The computer system 700 also includes a main memory 708, preferably random access memory (RAM), and may also include a secondary memory 710. The secondary memory 710 may include, for example, a hard disk drive 712, a removable storage drive 714, flash memory, a memory stick, and/or any similar non-volatile storage mechanism. The removable storage drive 714 may comprise a floppy disk drive, a magnetic tape drive, an optical disk drive, a flash memory, or the like. The removable storage drive 714 reads from and/or writes to a removable storage unit 718 in a well-known manner. The removable storage unit 718 may include a floppy disk, magnetic tape, optical disk to provide some examples which is read by and written to by the removable storage drive 714.

In alternative implementations, the secondary memory 710 may include other similar means for allowing computer programs or other instructions to be loaded into the computer system 700. Such means may include, for example, a removable storage unit 722 and an interface 720. Examples of such means may include a program cartridge and cartridge interface, such as that found in video game devices, a removable memory chip, such as an EPROM, or PROM, and associated socket, and other removable storage units 722 and interfaces 720 which allow software and data to be transferred from the removable storage unit 722 to the computer system 700.

The computer system 700 may also include a communications interface 724. The communications interface 724 allows software and data to be transferred between computer system 700 and external devices. The communications interface 724 may include a modem, a network interface, such as an Ethernet card to provide an example, a communications port, a PCMCIA slot and card, or the like. Software and data transferred via the communications interface 724 are in the form of signals, which may be electronic, electromagnetic, optical, or other signals capable of being received by communications interface 724. These signals are provided to the communications interface 724 via a communications path 726. The communications path 726 carries signals and may be implemented using wire or cable, fiber optics, a phone line, a cellular phone link, a radio frequency (RF) link or other communications channels.

Computer system 700 may additionally include computer display 730. The computer display 730 may also be used as an interactive interface (not shown) displayed via device I/O 706 on client 702.

In this document, the terms "computer program medium," "non-transitory computer readable medium," and "computer usable medium" are used to generally refer to media such as the removable storage unit 718, the removable storage unit 722, and a hard disk installed in the hard disk drive 712. Signals carried over communications path 726 may also embody the logic described herein. Computer program medium and computer usable medium may also refer to memories, such as the main memory 708 and the secondary memory 710, which may be memory semiconductors, such as DRAMs to provide an example. These computer program products are means for providing software to the computer system 700.

Computer programs, also referred to as computer control logic, are stored in the main memory 708 and/or the secondary memory 710. The computer programs may also be received via the communications interface 724. Such computer programs, when executed, enable the computer system 700 to implement the present invention as discussed herein. In particular, the computer programs, when executed, enable the processor 704 to implement the processes of the present invention as described above. Accordingly, such computer programs represent controllers of the computer system 700. Where the invention is implemented using software, the software may be stored in a computer program product and loaded into the computer system 700 using the removable storage drive 714, the interface 720, the hard drive 712, and/or the communications interface 724.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices, such as any type of random access memory to provide an example, secondary storage devices, such as hard drives, floppy disks, CD ROMS, ZIP disks, tapes, magnetic storage devices, optical storage devices, MEMS, and/or nanotechnological storage device to provide some examples, and communication mediums such as wired and wireless communications networks, local area networks, wide area networks, and/or intranets to provide some examples.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A method for generating a suppression key for overlaying of a virtual graphic onto a video to generate a video scene, comprising:
   (a) receiving a region of interest of the video containing a dynamic object;
   (b) determining a presence of the dynamic object in the region of interest; and
   (c) providing a suppression key in response to the presence of a dynamic object in the region, the suppression key comprising a plurality of suppression regions, each of the suppression regions corresponding to a region of the dynamic object, pixels of each of the suppression regions having a value corresponding to a characteristic of the corresponding region of the dynamic object.

2. The method of claim 1, further comprising:
   (d) combining the region of interest with the virtual graphic based upon the suppression key to provide the video scene.

3. The method of claim 2, wherein step (d) comprises:
   (d)(i) combining the region of interest with the virtual graphic at a location remote from a venue capturing the video.

4. The method of claim 1, wherein the region of interest is tied to a physical scene depicted in the video.

5. The method of claim 1, wherein step (b) comprises:
   (b)(i) determining the presence of the dynamic object based upon a spatial model of the dynamic object.

6. The method of claim 5, wherein step (b) further comprises:
   (b)(ii) extracting object features from the region of interest;
   (b)(iii) matching the object features to the spatial model; and
   (b)(iv) determining the dynamic object to be present when the object features extracted from the region of interest substantially matches the spatial model.

7. The method of claim 5, wherein the spatial model includes one or more reference images corresponding to at least a portion of the dynamic object, and wherein step (b) further comprises:
   (b)(ii) making a spatial comparison of the one or more reference images with the region of interest; and
   (b)(iii) determining the dynamic object to be present when the one or more reference images substantially match a portion of the region of interest.

8. The method of claim 5, wherein the spatial model includes a spatial color model corresponding to at least a portion of the dynamic object, and wherein step (b) further comprises:
   (b)(ii) making a color comparison of the spatial color model with the region of interest; and
   (b)(iii) determining the dynamic object to be present when a color distribution of the spatial color model substantially matches a color distribution of a portion of the region of interest.

9. The method of claim 1, wherein step (c) comprises:
   (c)(i) providing the suppression key having one or more key values corresponding to the dynamic object when the dynamic object is present in the region of interest.

10. The method of claim 1, wherein step (c) comprises:
    (c)(i) providing the suppression key having a default value when the dynamic object is absent from the region of interest.

11. A non-transitory electronic-readable medium having embodied thereon a program, the program being executable by a computer system to perform instructions for overlaying of virtual graphics onto a video to generate a video scene, the instructions comprising:
    instructions for receiving a region of interest of the video containing a dynamic object;
    instructions for determining a presence of the dynamic object in the region of interest; and
    instructions for providing a suppression key in response to the presence of a dynamic object in the region, the suppression key comprising a plurality of suppression regions, each of the suppression regions corresponding to a region of the dynamic object, pixels of each of the suppression regions having a value corresponding to a characteristic of the corresponding region of the dynamic object.

12. The non-transitory electronic-readable medium of claim 11, further comprising:
    instructions for combining the region of interest with the virtual graphic based upon the suppression key to provide the video scene.

13. The non-transitory electronic-readable medium of claim 12, wherein the instructions for combining comprise:
instructions for combining the region of interest with the virtual graphic at a location remote from a venue capturing the video.

14. The non-transitory electronic-readable medium of claim 11, wherein the region of interest is tied to a physical scene depicted in the video.

15. The non-transitory electronic-readable medium of claim 11, wherein the instructions for determining the presence of the dynamic object comprise:
determining the presence of the dynamic object based upon a spatial model of the dynamic object.

16. The non-transitory electronic-readable medium of claim 15, wherein the instructions for determining the presence of the dynamic object based upon the spatial model of the dynamic object further comprise:
instructions for extracting object features from the region of interest;
instructions for matching the object features to the spatial model; and
instructions for determining the dynamic object to be present when the object features extracted from the region of interest substantially matches the spatial model.

17. The non-transitory electronic-readable medium of claim 15, wherein the spatial model includes one or more reference images corresponding to at least a portion of the dynamic object, and wherein the instructions for determining the presence of the dynamic object based upon the spatial model of the dynamic object further comprise:
instructions for making a spatial comparison of the one or more reference images with the region of interest; and
instructions for determining the dynamic object to be present when the one or more reference images substantially match a portion of the region of interest.

18. The non-transitory electronic-readable medium of claim 15, wherein the spatial model includes a spatial color model corresponding to at least a portion of the dynamic object, and wherein the instructions for determining the presence of the dynamic object based upon the spatial model of the dynamic object further comprise:
instructions for making a color comparison of the spatial color model with the region of interest; and
instructions for determining the dynamic object to be present when a color distribution of the spatial color model substantially matches a color distribution of a portion of the region of interest.

19. The non-transitory electronic-readable medium of claim 11, wherein the instructions for providing the suppression key comprise:
instructions for providing the suppression key having one or more key values corresponding to the dynamic object when the dynamic object is present in the region of interest.

20. The non-transitory electronic-readable medium of claim 11, wherein the instructions for providing the suppression key comprise:
instructions for providing the suppression key having a default value when the dynamic object is absent from the region of interest.

21. An apparatus for overlaying of a virtual graphic onto a video to generate a video scene, comprising:
a video reception module configured to receive a region of interest of the video containing a dynamic object;
a video analysis module configured to determine a presence of the dynamic object in the region of interest; and
a key generator module configured to provide a suppression key in response to the presence of a dynamic object in the region, the suppression key comprising a plurality of suppression regions, each of the suppression regions corresponding to a region of the dynamic object, pixels of each of the suppression regions having a value corresponding to a characteristic of the corresponding region of the dynamic object.

22. The apparatus of claim 21, further comprising:
a combination module configured to combine the region of interest with the virtual graphic based upon the suppression key to provide the video scene.

23. The apparatus of claim 22, wherein the combination module is configured to combine the region of interest with the virtual graphic at a location remote from a venue capturing the video.

24. The apparatus of claim 21, wherein the region of interest is tied to a physical scene depicted in the video.

25. The apparatus of claim 21, wherein the video analysis module is configured to determine the presence of the dynamic object based upon a spatial model of the dynamic object.

26. The apparatus of claim 25, wherein the video analysis module is further configured to extract object features from the region of interest, to match the object features to the spatial model, and to determine the dynamic object to be present when the object features extracted from the region of interest substantially matches the spatial model.

27. The apparatus of claim 25, wherein the spatial model includes one or more reference images corresponding to at least a portion of the dynamic object, and wherein the video analysis module is further configured to make a spatial comparison of the one or more reference images with the region of interest and to determine the dynamic object to be present when the one or more reference images substantially match a portion of the region of interest.

28. The apparatus of claim 25, wherein the spatial model includes a spatial color model corresponding to at least a portion of the dynamic object, and wherein the video analysis module is further configured to make a color comparison of the spatial color model with the region of interest and to determine the dynamic object to be present when a color distribution of the spatial color model substantially matches a color distribution of a portion of the region of interest.

29. The apparatus of claim 21, wherein the suppression key is characterized as having one or more key values corresponding to the dynamic object when the dynamic object is present in the region of interest.

30. The apparatus of claim 21, wherein the suppression key is characterized as having a default value when the dynamic object is absent from the region of interest.

* * * * *